Patented June 1, 1954

2,680,128

UNITED STATES PATENT OFFICE 2,680,128

METHOD OF PRODUCING ORGANIC DIISOCYANATES

Robert J. Slocombe, Dayton, Ohio, and James H. Saunders, Anniston, Ala., assignors to Monsanto Chemical Company, St. Louis, Mo., a corporation of Delaware No Drawing. Application January 2, 1952,
Serial No. 264,633

11 Claims. (Cl. 260—453)

This invention relates to an improvement in the method of producing organic diisocyanates.

Heretofore, organic diisocyanates boiling within the range of about 70° C. to about 175° C. at a pressure of about 10 to about 20 mm. of mercury have been prepared by reacting phosgene with the corresponding primary diamines in the presence of relatively low boiling inert organic solvents to form an intermediate reaction product which was then treated with additional quantities of phosgene to form the corresponding diisocyanate. The crude product thus obtained was treated with an inert gas such as nitrogen, natural gas, etc. to remove hydrogen chloride and unreacted phosgene, whereupon the degassed product was distilled to separate the solvent from the diisocyanate.

As a modification of the above method, the above diisocyanates have been prepared by first forming the primary amine hydrochloride salt, slurrying the salt in a relatively low boiling inert organic solvent and then treating the slurry with phosgene to convert it into a crude solution of the corresponding diisocyanate. This solution was then treated in the manner indicated in the preceding paragraph to degas same, and separate the solvent from the diisocyanate product.

The above methods have enjoyed substantial commercial success, but they are subject to the disadvantage of producing excessively low yields of organic diisocyanates due to the difficulty encountered in recovering these products. For example, when the inert organic solvent and the major portion of the diisocyanate are removed by distillation, a substantial amount of by-product is produced as a result of polymerization and this by-product both consumes and entraps considerable quantities of the desired product. Moreover, if the distillation temperature is raised in an effort to remove the residual diisocyanate from the by-product, the residue solidifies to a brittle mass which presents operational problems since it can be removed from the reactor or still pot only with considerable difficulty.

It is an object of the instant invention to overcome the above disadvantages and provide a new method which permits more efficient recovery of the organic diisocyanates with the result that the overall yield of these products is substantially increased.

In accordance with the present invention, the crude solution of organic diisocyanate obtained by the above methods is subjected to distillation to successively separate the major portion of the low boiling inert organic solvent and the diisocyanate, leaving a residue containing a relatively small amount of the above diisocyanate. This residue is incorporated with a plasticizer of the type hereinafter described and the resulting product heated to distill the diisocyanate. As a modification of this technique, the plasticizer may be directly added to the crude solution or organic diisocyanate and the mixture fractionally distilled to successively separate the low boiling solvent and diisocyanate.

The plasticizer employed in the above operations may be one or more polynuclear hydrocarbons or halogenated aromatic derivatives thereof which boil at a temperature of about 270° C. to about 400° C. at atmospheric pressure. Illustrative examples of these are o-terphenyl, m-terphenyl, p-terphenyl, mixtures of two or more terphenyls, hydrogenated terphenyl mixtures such as disclosed and claimed in Patent 2,364,719, chlorinated biphenyl containing from 21% to 62% Cl, the chlorinated mixture of 60% biphenyl and 40% distilled high boiler containing about 65% Cl, chlorinated distilled high boiler containing 60% Cl and chlorinated isomeric terphenyl mixtures containing 42% Cl. In fact, any of the chlorinated diaryl mixtures boiling within the above range which are disclosed and claimed in Patent 1,892,400 to Swann Research, Inc. may be used.

For a complete understanding of the present invention, reference is made to the following specific examples. The parts are by weight.

Example I

Metatolylene diamine was reacted with phosgene in the presence of orthodichlorobenzene to form a slurry of an intermediate reaction product which was treated with additional amounts of phosgene to convert it into a crude solution of metatolylene diisocyanate. This solution was treated with natural gas to eliminate hydrogen chloride and unreacted phosgene and then subjected to vacuum distillation to remove the above solvent and substantial amounts of the above diisocyanate, leaving a black glassy residue which was solid at room temperature.

100 parts of the above residue was heated to 150° C. with stirring to convert it into the molten state, whereupon it was allowed to cool to room temperature. The cooled product was then reheated to a temperature of about 152° C. and while under a pressure of about 20 mm. of mercury in an effort to effect distillation and recovery of the entrapped diisocyanate. However, the residue merely swelled and frothed with the liberation of much phosgene but no distillate was recovered.

*Example II*

100 parts of the black glassy residue referred to in Example I and 50 parts of a plasticizer consisting of a chlorinated mixture of isomeric terphenyls containing 42% chlorine were mixed and heated to melt the mixture completely, whereupon the molten product was cooled with stirring to room temperature. Then, the cooled product was subjected to distillation, at a still pot temperature of about 162° C. and a pressure of 5.0–5.5 mm. of mercury, when stirring was stopped as a result of solidification of the residue. 19.5 parts of metatolylene diisocyanate was obtained as a distillate in a yield corresponding to 19.5% of theory, basis weight of original residue.

The above two examples show that the use of a plasticizer of the above type facilitates distillation of the residue and at the same time markedly increases the yield of the desired diisocyanate.

*Example III*

A residue consisting of about 58 parts of metatolylene diisocyanate and 42 parts of inactive material was prepared by the method described in Example I. To 78 parts of this residue there was added 40 parts of orthodichlorobenzene to yield a mixture containing about 36 parts of metatolylene diisocyanate, about 37.5 parts of orthodichlorobenzene and about 26.5 parts of inactive material.

290 parts of the mixture prepared in the above manner was heated and distilled under a pressure of about 7 mm. of mercury, using a still pot temperature of about 193° C. and about 128.0 parts of a distillate was collected having the following composition.

| | Parts |
|---|---|
| Metatolylene diisocyanate | 31.68 |
| Orthodichlorobenzene | 68.00 |
| Inactive material | .32 |

The recovery of the metatolylene diisocyanate obtained in the above manner amounted to about 22.4% of theory, basis original weight of residue before addition or orthodichlorobenzene.

*Example IV*

300 parts of the residue employed in Example III and 100 parts of the plasticizer used in Example II were melted together and subjected to distillation, using a still pot temperature of about 205° C. and a pressure of about 14 mm. of mercury. This resulted in the production of 169 parts of a distillate containing about 62.6 parts of metatolylene diisocyanate which corresponds to a yield of about 33.4% of theory, basis original weight of residue prior to addition of plasticizer.

The foregoing Examples (III and IV) clearly illustrate that the use of a high boiling plasticizer effects a substanial improvement in the recovery of metatolylene diisocyanate as compared with that obtainable with a low boiling solvent.

In order to further illustrate suitable operating conditions of the instant invention, reference is made to the following table.

| Run No. | Residue Parts | Pressure, mm. Hg | Maximum Still Pot Temp., ° C. | Plasticizer Type | Plasticizer Parts | Percent Yield of Metatolylene Diisocyanate Based on Residue |
|---|---|---|---|---|---|---|
| 1 | 250 | 4 | 150 | Chlorinated Isomeric Terphenyl Mixture Containing 42% Chlorine. | 10 | 9.2 |
| 2 | 250 | 4 | 170 | ——do—— | 10 | 23.6 |
| 3 | 250 | 4 | 160 | ——do—— | 10 | 23.6 |
| 4 | 250 | 4 | 173 | ——do—— | 20 | 23.4 |
| 5 | 250 | 4 | 160 | ——do—— | 5 | 20.6 |
| 6 | 250 | 4 | 160 | ——do—— | 10 | 32.8 |
| 7 | 500 | 2 | 160 | ——do—— | 10 | 13.2 |
| 8 | 500 | 2 | 160 | ——do—— | 10 | 13.3 |

The residues in the above runs were prepared by the method described in Example I, but in the case of runs 1–6 inclusive orthodichlorobenzene was removed to the extent of about 45% by weight of the crude solution of metatolylene diisocyanate.

The above results indicate in the case of metatolylene diisocyanate that a temperature of about 160° C., about 4% by weight of plasticizer and a pressure of about 4 mm. of mercury produce the best yields based on the residue charged to the still pot.

The method of the instant invention is applicable to the production and recovery of organic diisocyanates which boil at a temperature of about 70° C. to about 175° C. while under a pressure of from 10 to 20 mm. of mercury. Illustrative examples of these are ethylene diisocyanate, propylene diisocyanate, butylene diisocyanate, amylene diisocyanate, hexamethylene diisocyanate, tolylene diisocyanates, chlorophenylene diisocyanate, metaphenylene diisocyanate and paraphenylene diisocyanate.

The plasticizers of the instant invention are employed in an amount corresponding to about 5% to about 100% by weight based on the diisocyanate content of the crude organic solvent solution of this product. More specifically, they are employed in an amount corresponding to about 5% to about 50% by weight and within these limits about 10% to about 25% by weight is preferred.

The low boiling solvents of the prior art referred to above having boiling points which do not exceed 255° C. at atmospheric pressure. Typical examples of these are benzene, chlorobenzene, dichlorobenzene, toluene, xylene, nitrobenzene, cyclohexane, kerosene, carbon tetrachloride, tetrachloroethylene, trichloroethylene, tetrachloroethane, trichlorobenzene, decahydronaphthalene, tetrahydronaphthalene, amylbenzene, p-cymene, o-cymene, m-cymene, n-dodecylbenzene, naphthalene, n-heptylcyclopentane and biphenyl.

The above description and examples are intended to be illustrative only. Any modification or variation therefrom which conforms to the spirit of the invention is intended to be included within the scope of the claims.

What we claim is:

1. In the method of producing organic diisocyanates boiling from about 70° C. to about 175° C. at about 10 to about 20 mm. of Hg by reacting phosgene with a compound selected from the group consisting of the corresponding primary organic diamines and their hydrohalide salts in the presence of a low boiling inert organic solvent and thereby forming a crude solution of the corresponding diisocyanate, the improvement which comprises adding a plasticizer to said solution and then fractionally distilling the resulting product to recover its diisocyanate content, said plasticizer being selected from the group consisting of a polycyclic aromatic hydrocarbon, a hydrogenated polycyclic aromatic hydrocarbon and a chlorinated aromatic hydrocarbon which boils at a temperature of from about 270° C. to about 400° C.

2. The method defined in claim 1 wherein the low boiling inert organic solvent is substantially completely removed from the crude solution of organic diisocyanate prior to the addition of the plasticizer.

3. The method defined in claim 1, wherein the plasticizer is a chlorinated biphenyl containing from 21% to 62% by weight of chlorine.

4. The method defined in claim 2, wherein the plasticizer is a chlorinated mixture of 60% biphenyl and 40% distilled high boiler containing about 65% Cl.

5. The method defined in claim 2, wherein the plasticizer is a chlorinated isomeric terphenyl mixture containing 42% Cl.

6. The method defined in claim 2, wherein the plasticizer is a chlorinated diaryl mixture boiling from about 270° C. to about 400° C.

7. The method defined in claim 2, wherein the plasticizer is a hydrogenated terphenyl boiling in the range of about 270° C. to about 400° C.

8. The method defined in claim 2, wherein the plasticizer employed is a partially hydrogenated hydrocarbon liquid mixture characterized by having a specific gravity of 1.05 to 0.955 at 25° C. and obtained by the partial catalytic hydrogenation of the mixture of normally solid hydrocarbons boiling about 350° C. at 760 mm. pressure and formed in the synthesis of biphenyl in the pyrolysis of benzene at elevated temperatures.

9. The method defined in claim 2, wherein the plasticizer is used in an amount varying within the limits of about 5% to about 100% by weight, basis organic diisocyanate content of the crude solution of diisocyanate.

10. The method defined in claim 2, wherein the plasticizer is used in an amount varying within the limits of about 5% to about 50% by weight, basis organic diisocyanate content of the crude solution of diisocyanate.

11. The method defined in claim 2, wherein the plasticizer is used in an amount varying within the limits of about 10% to about 25% by weight, basis organic diisocyanate content of the crude solution of diisocyanate.

References Cited in the file of this patent

UNITED STATES PATENTS

| Number | Name | Date |
| --- | --- | --- |
| 2,071,932 | Macht | Feb. 23, 1937 |
| 2,223,171 | Gaylor | Nov. 26, 1940 |
| 2,374,340 | Farlow | Apr. 24, 1945 |